March 5, 1968 S. L. REEVES ET AL 3,371,874
PEPPER MILL
Filed June 3, 1965
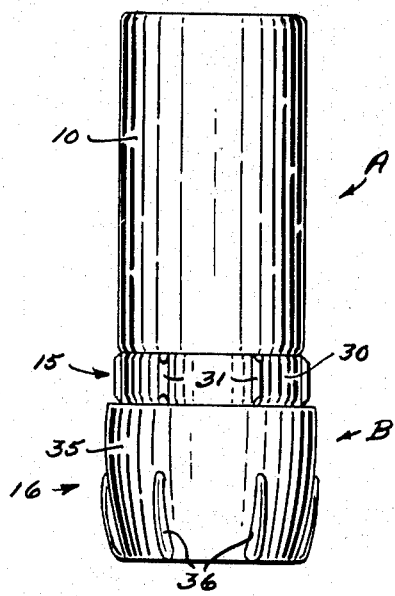
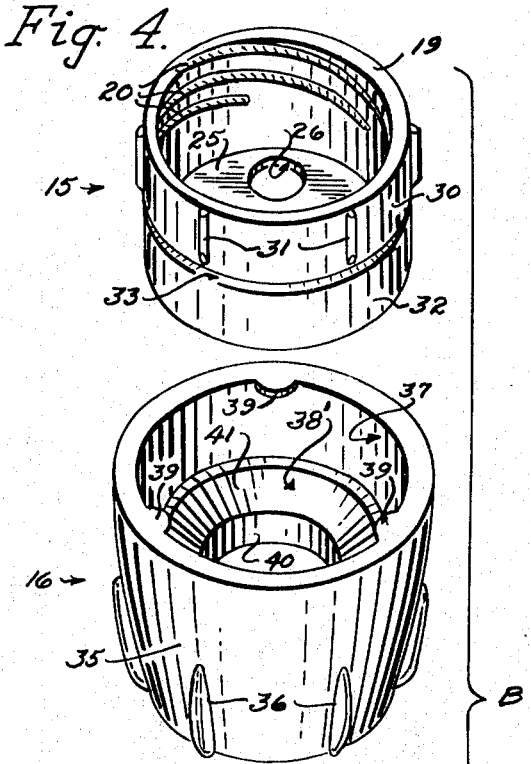
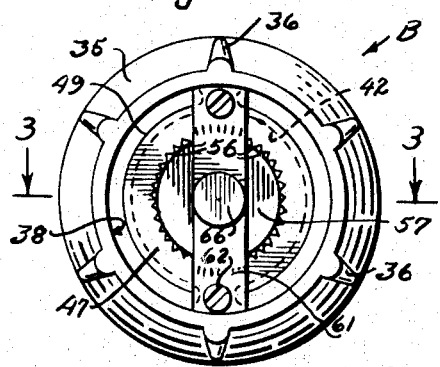
INVENTORS
STUART L. REEVES
CLYDE A. REEVES
BY Rommel, Aluxin & Rommel
ATTORNEYS

United States Patent Office 3,371,874
Patented Mar. 5, 1968

3,371,874
PEPPER MILL
Stuart L. Reeves, 1440 SW. 67th 73159, and Clyde A. Reeves, 8601 NW. 18th 73127, both of Oklahoma City, Okla.
Filed June 3, 1965, Ser. No. 461,035
10 Claims. (Cl. 241—168)

This invention relates to improvements in pepper mills.

This invention was developed primarily in connection with mills for grinding peppercorn and it is thus herein shown. It is, however, to be clearly understood that the mill of our invention may be used with equal facility in the grinding of other seasoning and food products which come in a whole particle form and may be dry ground for use.

Pepper mills in general use today are conventionally of the type including a specially designed body portion which serves as a container for the peppercorn and has a built-in grinding mechanism. In use of this type of pepper mill, the peppercorn is required to be poured or transferred to the container of the body portion of the pepper mill from the container in which it was packaged when purchased. It is a primary object of this invention to provide a pepper mill having a grinding mechanism and drive mechanism therefor which is operable independently of any special peppercorn container facilities and may be directly attached to a conventional container such as those in which peppercorn is packaged for consumer use. Of course, ornate or originally designed containers may be used in connection with our pepper mill, but operation of the pepper mill is not dependent upon a special configuration or construction of the container.

A further object of the invention is to provide a pepper mill which is simple and economical to build and easy to assemble. Our improved pepper mill may, for instance, be provided with a body portion of molded plastic, or may be machine tooled out of wood or other suitable materials. It is believed that the inexpensive form of the invention, that in which the body portion is of molded plastic, will find most wide acceptance and use and it is this form that we have thus shown herein.

Other objects and advantages of the invention will be apparent during the course of the following detailed description, taken in connection with the accompanying drawing, forming a portion of this specification, and in which drawing:

FIG. 1 is a side view of our improved pepper mill shown as attached to a peppercorn container.

FIG. 2 is a bottom view of our improved pepper mill.

FIG. 3 is a sectional view taken substantially on the line 3—3 of FIG. 2.

FIG. 4 is an exploded perspective view of our improved pepper mill.

In the drawing, wherein for the purpose of illustration is shown a preferred embodiment of the invention, and wherein similar reference characters designate corresponding parts throughout the several views, the letter A may generally designate a container, and B our improved pepper mill.

Container A may be any suitable container for peppercorn, such as a jar in which peppercorn is generally packaged for consumer purchase. The type of container shown herein includes a material receiving body portion 10 having a neck 11, cap receiving threads 12 being peripherally provided about neck 11 for receiving the usual closure cap (not shown) with which such containers are provided.

Pepper mill B preferably includes a first body portion 15, second body portion 16, grinding means 17, and mounting means 18 for operable attachment of grinding means 17 to second body portion 16.

First body portion 15 preferably comprises a housing 19 which is in the nature of a cap for container A.

Inasmuch as housing 19 is in the nature of a cap for container A, the same is provided with means for attachment thereof to container A which are directly comparable to the means used for attachment of the conventional cap which had been applied to container A when the same was purchased. In the embodiment shown, housing 19 is provided with threads 20 which engage cap receiving threads 12 of container A in the same manner as the threads of the conventional closure cap which has been removed therefrom. Threads 20 are preferably disposed so that, upon rotation of first body portion 15 in one direction, housing 19 will be tightened on container A, and, by rotation of the first body portion 15 in the opposite direction, housing 19 may be loosened and removed from container A.

Housing 19 is preferably of a generally cylindrical configuration having threads 20 on the inner face thereof and adjacent one end thereof, and is provided at the other end thereof with an end wall 25. End wall 25 is preferably provided with a plurality of passageway means 26 for guiding and regulating flow of material from container A, through housing 19, to second body portion 16. A polygonal socket 27 is preferably provided in end wall 25, the same constituting means operably connected with grinding means 27, as will be subsequently described.

Although we have found one of the most satisfactory forms of the invention to be the provision of an end wall 25 having a pair of diametrically opposed openings 26 for regulation of the flow of material through first body portion 15 to second body portion 16, it is, of course, entirely within the scope of our invention to eliminate completely this end wall 25. This will provide virtually unrestricted flow of material from the container, through first body portion 15, to second body portion 16. When end wall 25 is eliminated, it is necessary to provide some means, such as a diametrically disposed bar, for support of a polygonal socket which comprises means operably connected with the grinding means 17 in the same manner as polygonal socket 27 of end wall 25.

Housing 19 preferably includes an upper substantially cylindrical peripheral portion 30 having a plurality of outwardly extending peripheral lugs 31 spaced thereabout. Lugs 31 provide a gripping surface which facilitates rotation of housing 19 in attachment and removal to container A. Housing 19 also preferably includes a lower relatively smooth cylindrical peripheral portion 32. Portion 32 is provided for guiding rotative abutment with second body portion 16, as will be subsequently described.

Cylindrical peripheral portion 32 is preferably provided with an endless groove 33 extending peripherally thereabout, for cooperation with second body portion 16, as will be subsequently described.

Second body portion 16 preferably comprises a substantially cylindrical sleeve 35, the outer periphery of which may be provided with a plurality of outwardly extending peripheral lugs 36 which form a gripping surface for rotation of second body portion 16 with respect to first body portion 15, as will be subsequently described. Sleeve 35 preferably includes an upper cylindrical inner face 37 which is of a diameter for rotative abutment with cylindrical peripheral portion 32 of first body portion 15 and lower cylindrical inner face 38 which serves as a discharge guideway for ground material after processing by grinding means 17. A plurality of lock tabs 39 are preferably provided projecting inwardly from inner face 37. Lock tabs 39 are preferably of a configuration to be rotatively received within endless groove 33 and this relationship provides the means for rotatable interconnection of second body portion 16 with body portion 15.

Second body portion 16 includes a recessed transversely extending wall portion 38' having a substantially vertically extending wall 40 which defines a substantially cylindrical socket for receiving grinding means 17 and to which attaching means 18 may be interconnected. Recessed wall portion 38' likewise includes a horizontally angled portion 41 which may serve as a guideway for receiving material passing through sleeve 35 and guiding the same to the grinding means 17.

Vertically extending grooves 42 have no specific purpose insofar as the invention is concerned, and may be done away with in the machining of our improved pepper mill. However, inasmuch as it is anticipated that the same will be mainly formed of molded plastic, such grooves 42 are provided for the purpose of accelerating curing of the plastic.

Grinding means 17 preferably includes a pair of cooperating members which may comprise a tubular bushing 45 and a grinding wheel 46.

Bushing 45 preferably includes a main body portion 47 having a substantially cylindrical peripheral portion 48 of an outer diameter to conveniently interfit within the socket formed by substantially vertically extending wall 40 of recessed transversely disposed wall portion 38'. One end of main body portion 47 is provided with a peripheral flange 49 which abuts against the lowermost end of vertically extending wall 40, as shown in FIG. 3. Flange portion 49 is preferably provided with recessed portions 50 which cooperate with attaching means 18 in holding bushing 45 in a non-rotative relation with respect to second body portion 16, as will be subsequently described.

The inner face of bushing 45 is preferably provided with a plurality of teeth 52. Teeth 52 are preferably divided into two sections, upper section 53 disposed most closely adjacent first body portion 15 when the same is assembled in operative grinding relationship and having teeth 54 relatively widely spaced apart and diverging outwardly from the central axis of bushing 45, toward the end thereof most closely adjacent first body portion 15; and lower section 55 having teeth 56 relatively closely spaced together and diverging outwardly from the central axis of bushing 45 adjacent the opposite end thereof from divergence of section 53.

Grinding wheel 46 preferably includes a body portion 57 having a truncated conical shape, the periphery thereof being provided with a plurality of substantially helical spaced teeth 58. The lesser end of body portion 57 is provided with a polygonally shaped shaft portion 60 and the greater end thereof with an axially disposed conical recess 59, for purposes which will be subsequently described.

In assemblage of grinding means 17, grinding wheel 46 is mounted within bushing 45, the respective axes thereof being coextensive. As shown in FIG. 3, wherein the parts are thus mounted, teeth 58 of grinding wheel 46 cooperatively interact with relatively closely spaced teeth 56 of bushing 45 to provide the principal grinding zone for the grinding of material received thereby and cooperate with relatively widely spaced teeth 54 of bushing 45 in receiving and guiding material to the grinding zone of the grinding means. Of course, particularly in the case of grinding large particles, some grinding action is likely to occur as the particles are received between teeth 58 and 54, and this area may thus also be considered a part of the grinding zone. However, as previously stated, the area of interaction between teeth 58 and 56 provides the principal grinding zone.

Attaching means 18 preferably includes a longitudinal bar member 61 which extends diametrically across the substantially cylindrical socket formed by wall 40 and is attached to wall 40 by screws 62. Screws 62 pass through openings 63 of bar member 61, within recessed portions 50 of bushing 45 and are screwed into wall 40. Screws 62, in passing through recessed portions 50 of bushing 45, hold bushing 45 in a non-rotative relationship with respect to second body portion 16.

Polygonal shaft 60 of grinding wheel 46 is received within polygonal socket 27 of first body portion 15, thus holding grinding wheel 46 in a non-rotative relationship with respect to first body portion 15.

In assemblage of the pepper mill, lock tabs 39 are snap fitted within groove 31, cylindrical peripheral portion 32 being in guiding rotative abutment with respect to cylindrical face 37, and second body portion 16 is thus maintained in cooperative, freely rotatable relationship with respect to first body portion 15. With grinding means 17 attached to second body portion 16 as above described, and when second body portion 16 is rotated with respect to first body portion 15, bushing 45 will be rotated with respect to grinding wheel 46, providing for the grinding of material at the grinding zone thereof as above described.

Inasmuch as grinding wheel 46 is of a truncated conical shape, it is obvious that pressure on the base end thereof will force teeth 58 thereof toward teeth 56 of bushing 45. Adjusting means 65 is provided for regulating the pressure of teeth 58 against teeth 56. Adjusting means 65 preferably includes a threaded member 66 having a cone shaped tip 66'. Threaded member 66 is received through threaded opening 68 of bar member 61 with tip 66' interfitting within conical recess 59 of grinding wheel 46 in juxtaposition to urge grinding wheel 46 into operable grinding engagement with bushing 45. A lock nut 70 may be provided for maintaining member 66 in proper position. Variation of pressure of adjusting means 65 against body portion 57 will regulate the size to which material received by grinding means 17 will be ground.

In some instances of grinding material to a very fine degree, and if the direction of rotation of first body portion 15 onto container A was in the same direction of rotation as the primary grinding rotation of second body portion 16 with respect to first body portion 15, there would be some likelihood of first body portion 16 becoming loosened and completely unthreaded from connection with container A. The preferred form of our invention is the provision of a primary grinding relationship between teeth 56 of bushing 45 and teeth 58 of grinding wheel 46 so that the primary grinding rotation thereof will be in the same direction of rotation as the rotation of first body portion 15 in tightening connection of first body portion 15 on container A.

We have thus provided an improved pepper mill in which the various parts thereof cooperatively interact with each other in the grinding of peppercorn.

Various changes may be made to the form of invention herein shown and described without departing from the spirit of the invention or the scope of the following claims.

We claim:

1. In a pepper mill, the combination of a first body portion, a second body portion, grinding means, and mounting means for operable attachment of said grinding means to said second body portion; said first body portion including a housing having means for attachment of said first body portion to a container, passageway means for enabling passage of material from an attached container to said second body portion, and a cylindrical peripheral portion, an endless groove extending about said cylindrical peripheral portion of said housing, and means operably connected with said grinding means; said second body portion including a guideway for receiving material passing through said first body portion from an attached container and guiding the same to said grinding means, a sleeve portion having a cylindrical inner face provided with a plurality of tabs projecting inwardly therefrom toward the axis of said cylindrical inner face, said tabs of said second body portion being received within said endless groove of said first body portion in juxtaposition to provide means for freely rotatable attachment of said second body portion to said first body portion; and said grinding means including a pair of cooperating members operably disposed for grinding action on rotation of one of said body portions with respect to the other through cooperative interaction of one of said cooperating members with said mounting means and cooperative interaction of the other of said cooperating members with said means of said first body portion operably connected with said grinding means.

2. In a pepper mill, the combination of a first body portion, means for attachment of said first body portion to a container, a second body portion, means for rotatable interconnection of said second body portion with said first body portion, grinding means, and mounting means for operable attachment of said grinding means to said second body portion, said first body portion including passageway means for enabling passage of material from a container attached thereto to said second body portion, and means operably connected with said grinding means, said second body portion including a guideway for guiding of material received from said first body portion to said grinding means, and said grinding means including a pair of cooperating members operably disposed for grinding action on rotation of one of said body portions with respect to the other through cooperative interaction of one of said cooperating members with said mounting means and cooperative interaction of the other of said cooperating members with said means of said first body portion operably connected with said grinding means, 3. The combination as specified in claim 2 wherein said first body portion comprises a cap for a container, said means for attachment of said first body portion to a container comprises threads provided on said cap for meshing with cap receiving threads of a container, and said passageway means comprises a guide for regulating the flow path of material from an attached container to said second body portion.

4. The combination as specified in claim 2 wherein said means for attachment of said first body portion to a container comprises threads provided on said first body portion for meshing with cap receiving threads of a container.

5. The combination as specified in claim 4 wherein the meshing threaded interconnection of said threads of said first body portion and the cap receiving threads of a container provides for tightening of said first body portion on a container by rotation of said first body portion in one direction and loosening and removal of said first body portion from a container by rotation of said first body portion in the opposite direction, and said pair of cooperating members of said grinding means are disposed in juxtaposition for primary grinding action on rotation of said second body portion with respect to said first body portion in the same direction of rotation as said first body portion is rotated in tightening of said first body portion on a container.

6. The combination as specified in claim 2 wherein said passageway means comprises a guide for regulating the flow path of material from an attached container to said second body portion.

7. The combination as specified in claim 2 wherein said means of said first body portion operably connected with said grinding means comprises a polygonal socket; said mounting means for operable attachment of said grinding means to said second body portion includes a grinding means receiving socket; and said grinding means includes a tubular bushing having an inner face provided with a plurality of teeth, said bushing being received within said grinding means receiving socket in axial alignment with the axis of rotation of said second body portion with respect to said first body portion, a grinding wheel having a plurality of teeth disposed peripherally thereabout, said grinding wheel being received by said bushing with the axis thereof coextensive with the axis of said bushing and with the teeth of said bushing and said grinding wheel juxtaposed with respect to each other for grinding of material received by said grinding means, said grinding wheel including a polygonal shaft extending to and received by said polygonal socket of said first body portion in a relationship to hold said grinding wheel in a non-rotative position with respect to said first body portion, and attaching means for mounting said bushing in a non-rotative position with respect to said second body portion.

8. The combination as specified in claim 7 wherein the inner face of said bushing most closely adjacent said first body portion diverges outwardly from the axis of said bushing and is provided with relatively widely spaced teeth, the inner face of the opposite end of said bushing diverges outwardly from the axis of said bushing and is provided with relatively closely spaced teeth, said grinding wheel having a truncated conical shape with said teeth thereof interacting with said relatively closely spaced teeth of said bushing in the provision of a principal grinding zone for the grinding of material received thereby and interacting with said more widely spaced teeth of said bushing for the guiding of material to the principal grinding zone of said grinding means.

9. The combination as specified in claim 8 including adjusting means for regulating the pressure of interaction of said teeth of said grinding wheel with said relatively closely spaced teeth of said bushing.

10. The combination as specified in claim 9 wherein said adjusting means is carried by said attaching means and abuts against said grinding wheel in juxtaposition to regulate the pressure of interaction of said teeth of said grinding wheel with said relatively closely spaced teeth of said bushing.

References Cited

UNITED STATES PATENTS

| | | |
|---|---|---|
| 210,837 | 12/1878 | Chalas. |
| 449,225 | 3/1891 | Marbach. |
| 459,854 | 9/1891 | Maillot. |
| 1,264,134 | 4/1918 | Quick. |
| 2,407,808 | 9/1946 | Bivens. |
| 2,974,887 | 3/1961 | Grandinetti. |
| 3,136,491 | 6/1964 | Posmanter. |

FOREIGN PATENTS

| | | |
|---|---|---|
| 30,084 | 5/1884 | Germany. |
| 306,013 | 5/1955 | Switzerland. |
| 794,560 | 5/1958 | England. |

WILLIAM W. DYER, JR., *Primary Examiner.*

R. J. ZLOTNIK, *Assistant Examiner.*